United States Patent [19]
Sambhu et al.

[11] 3,753,098
[45] Aug. 14, 1973

[54] GUARDED OIL TEST CELL WITH TRIAXIAL CONNECTOR

[75] Inventors: Mahesh K. Sambhu, Wayne; John J. Hinchey, Jersey City, both of N.J.

[73] Assignee: Beckman Instruments, Inc., Fullerton, Calif.

[22] Filed: May 8, 1972

[21] Appl. No.: 251,381

[52] U.S. Cl............................. 324/65 P, 324/30 B
[51] Int. Cl............................................ G01r 27/02
[58] Field of Search.............. 324/65 P, 65 R, 30 B, 324/30 R

[56] References Cited
UNITED STATES PATENTS

| | | | |
|---|---|---|---|
| 2,221,306 | 11/1940 | Christie | 324/30 R |
| 3,173,969 | 3/1965 | Kapff | 324/30 B |
| 3,376,501 | 4/1968 | Peranio | 324/65 R X |
| 3,548,304 | 12/1970 | Lohnes | 324/65 R |

Primary Examiner—Stanley T. Krawczewicz
Attorney—James M. Thomson et al.

[57] ABSTRACT

A guarded test cell for power factor measurement of oil including a connector adapted to receive a triaxial extension cable. The cell includes a housing within which a tubular center electrode, tubular guard electrode and a tubular outer electrode are concentrically and removably mounted. The housing also includes a cover having a removable plug mounted in an opening formed therein in alignment with the axis of the hollow center electrode. A connector, adapted to receive the triaxial extension cable, is also mounted in the housing generally at right angles to the electrodes. The connector is provided with electrically isolated contacts which engage, respectively, the electrodes of the cell. The cell electrodes are adapted to be immersed in oil samples, such as samples of elevated temperature, and the plug in the cover can be removed to permit insertion of a thermometer into the oil within the hollow center electrode. The extension cable allows the cell to be energized from a remotely located measuring unit.

4 Claims, 4 Drawing Figures

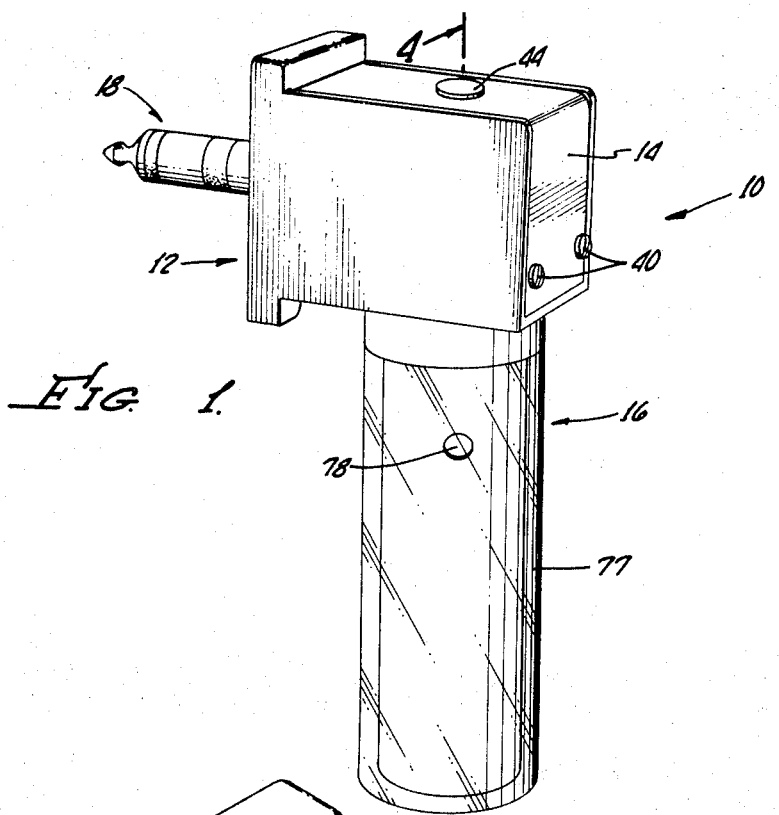
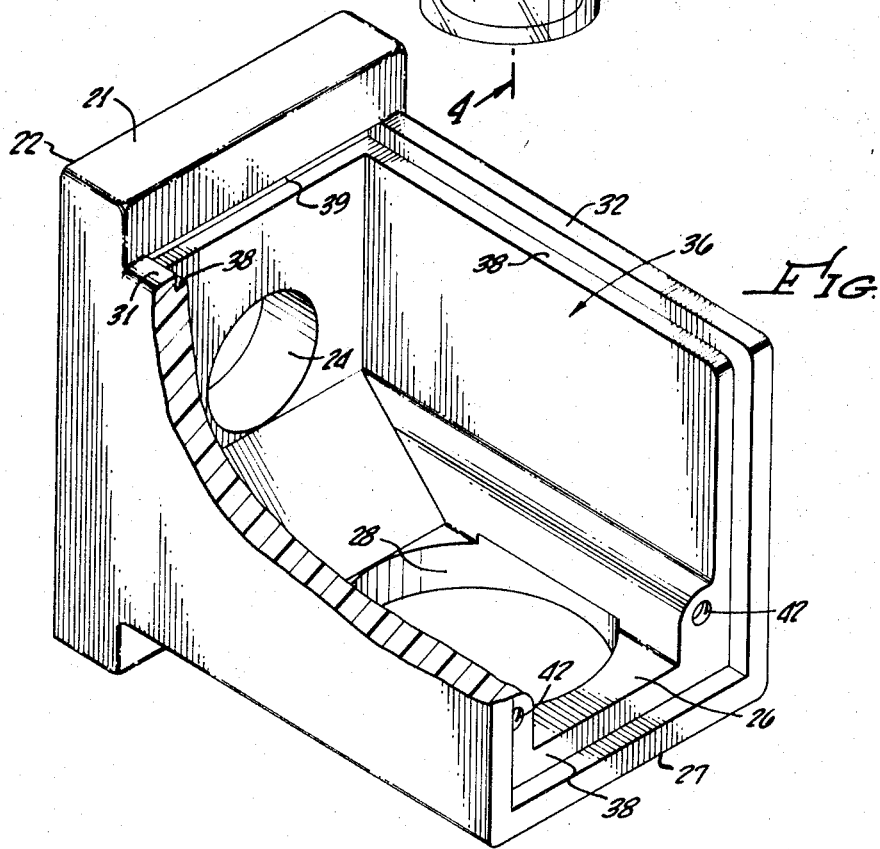

PATENTED AUG 14 1973

GUARDED OIL TEST CELL WITH TRIAXIAL CONNECTOR

BACKGROUND OF THE INVENTION

The present invention relates to a guarded oil test cell adapted for use in measuring the power factor of oil samples. More particularly the invention concerns an oil test cell that is adapted to be remotely connected, via a triaxial extension cable, with an energizing and measuring bridge and a display meter to permit the measurement of the power factor of oil samples and especially samples of elevated temperature.

Various electrode test cells have been used for measuring the power factor of samples of oil, such as the insulating oil utilized in electrical equipment, for example. As used herein, the term oil power factor represents the ratio of the watts dissipated in the cell and oil to the total volt-amperes drawn by the cel' and oil. Measurement of oil power factor is desir-able as an indication of the insulating qualities of the oil, and for other purposes. Therefore it is desirable to measure the power factor of oil samples at ordinary and at elevated temperatures.

SUMMARY OF THE INVENTION

Accordingly it is an object of the invention to provide an improved, guarded oil test cell adapted for the remote measurement of the power factor of oil samples at elevated temperature.

It is another object of the invention to provide a guarded oil test cell with a triaxial conductor adapted to receive a triaxial extension cable so that the oil cell can be selectively energized from a remote measuring circuit and display meter.

It is a further object of the invention to provide an oil test cell adapted for connection with a triaxial extension cable wherein the inner shield of the triaxial cable and a guard electrode of the cell, electrically associated therewith, cooperate to shield the test electrodes of the cell from electrical interference when the cell is used near energized electrical equipment.

It is yet another object of the invention to provide a guarded test cell which is adapted for easy assembly and disassembly for cleaning and maintenance purposes.

These and other objects of the invention are attained in a test cell which includes a housing within which a tubular center electrode, a tubular guard electrode and a tubular outer electrode are concentrically mounted, so as to be immersed in oil samples. The electrodes are isolated by insulator sleeves inter-spersed therebetween. The housing otherwise includes a cover having a removable plug mounted in an opening formed therein, aligned with the hollow center electrode. A triaxial connector is also removably mounted in the housing generally at a right angle to the electrodes, adapted to receive a triaxial extension cable. The connector includes electrically isolated contacts which are associated, respectively, with the three electrodes of the cell. With the cell electrodes immersed in an oil sample, such as a sample of elevated temperature, the plug can be removed from the cover to permit insertion of a thermometer into contact with the oil contained within the hollow center electrode. The triaxial extension cable allows the cell electrodes to be energized from a remotely located measuring circuit and display meter.

BRIEF DESCRIPTION OF THE DRAWINGS

The foregoing objects and other features and advantages of the invention will become apparent from the following detailed description of the invention taken in conjunction with the accom-panying drawings wherein:

FIG. 1 is a diagrammatic, perspective view of a test cell comprising one preferred embodiment of the invention;

FIG. 2 is a perspective view of the housing of the cell, without a cover and having parts broken away;

DETAILED DESCRIPTION OF THE INVENTION

Figure 3:
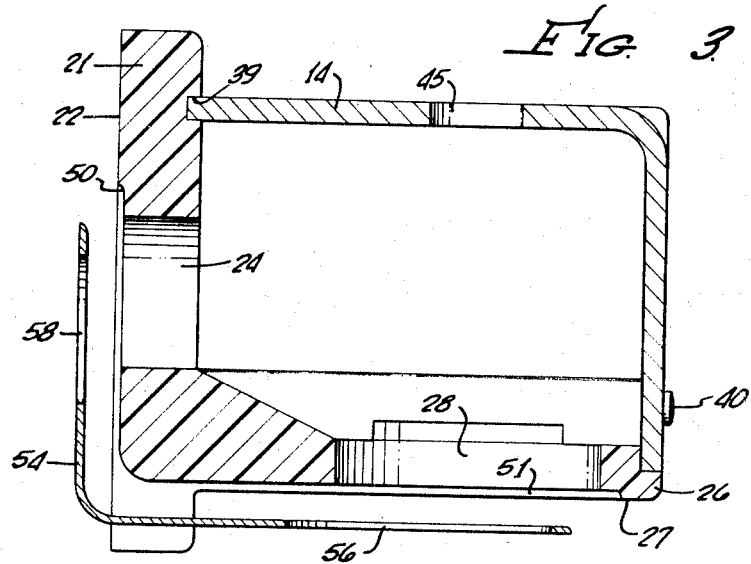
FIG. 3 is a side view, in section, of the housing and an associated electrical contact of the cell.

Referring now to the drawings, one preferred embodiment of a test cell 10 is particularly illustrated including a housing 12 having a removable cover 14, a measuring unit 16, and a triaxial connector 18.

Referring particularly to FIGS. 2 and 3, the housing is preferably formed of molded insulating material, such as plastic or Teflon, and generally comprises a front plate 21, having a flat face 22, through which a circular opening 24 is formed to receive triaxial connector 18 in a manner described hereinafter. The housing otherwise includes a bottom plate 26 extending at a right angle to the front plate, having a bottom face 27, through which a circular opening 28 is formed adapted to receive measuring cell 16, also in a manner described hereinafter. Sides 31, 32 are connected between the front portion and the bottom plate whereby a central chamber 36 bounded on four sides is defined within the housing. As shown, the exposed edges of sides 31, 32 and the end of plate 26 are recessed to define shoulder surfaces 38 along the edges that receive and support the edges of an L-shaped cover 14. Cover 14 is removably retained upon the housing, having one end engaged within a slot 39 formed in front plate 21 of the housing and its other end secured to the rear of the housing by screws 40 extending through suitable openings in the cover and engaging threaded openings 42 formed in sides 31, 32 of the housing. Cover 14 further includes a removable plug 44 which is mounted in an opening 45 formed in the cover generally opposite opening 28 for a purpose described hereinafter. Plug 44 can be of any suitable type, but in the embodiment illustrated is press-fit into a circular opening.

Referring particularly to FIG. 3, front face 22 of the housing is formed with a generally rectangular recessed portion 50 therein, surrounding opening 24 and extending to the bottom of the front plate. In similar fashion, bottom face 27 of the housing is formed with a generally rectangular recessed portion 51 therein surrounding opening 28 and extending to the front of the housing. Recesses 50, 51 cooperate to receive a wide L-shaped contact 54, preferably formed of stainless steel. The lateral dimensions of contact 54 are such that it fits within recesses 50, 51. Contact 54 is formed with a circular opening 56 therein, corresponding in size to opening 28, and a circular opening 58, corresponding in size to opening 24. Accordingly, with contact 54 seated within recesses 50, 51 of the housing, measuring unit 16 and triaxial connector 18 can be inserted through the appropriate holes in the contact and the housing, respectively.

Figure 4:
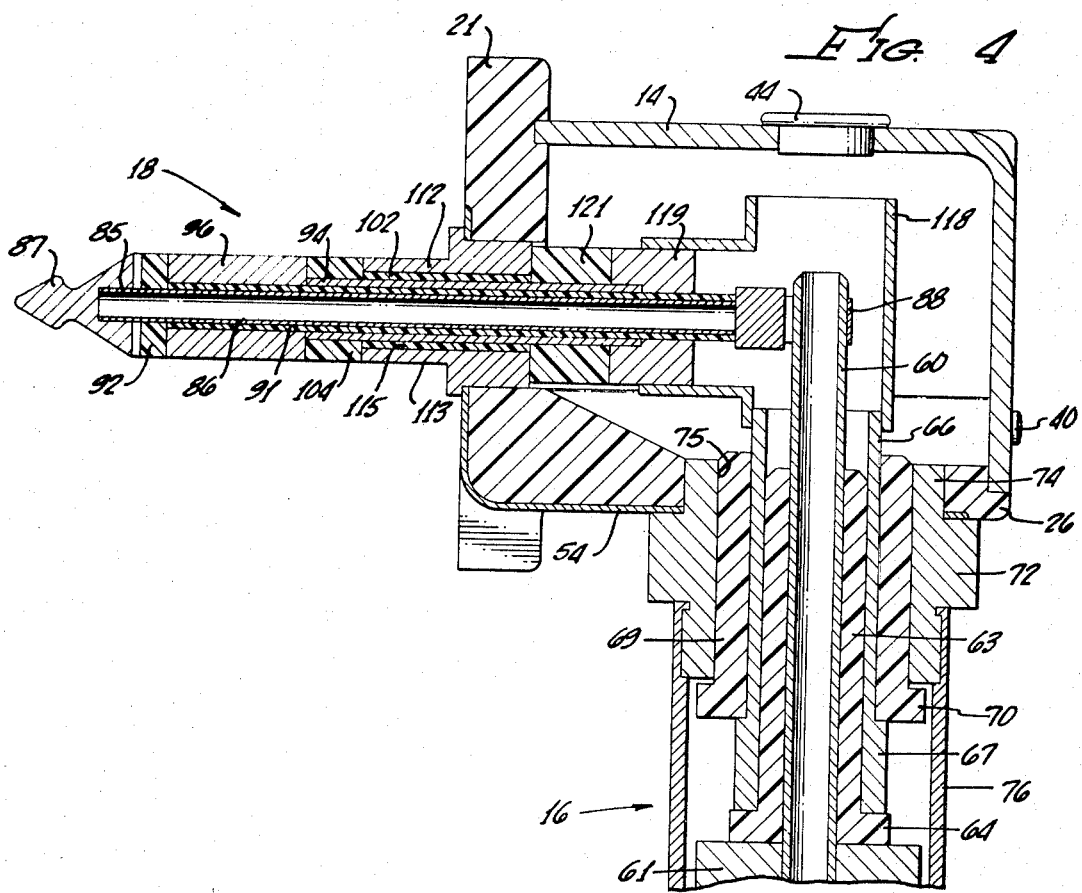
FIG. 4 is a side view, in section, of the cell taken along lines 4—4 of FIG. 1.

Referring particularly to FIG. 4 the structure and assembly of the measuring unit are particularly illustrated. The measuring unit comprises an elongate hollow center electrode 60 preferably formed of stainless steel tubing. Electrode 60 terminates in an enlarged lower end 61 which is adapted to contact the oil samples. An insulator sleeve 63 having an extending flange 64 formed at the lower end thereof surrounds the center portion of electrode 60. The sleeve and flange are preferably formed of Teflon.

A stainless steel guard electrode 66 is also provided, comprising a hollow sleeve surrounding insulator sleeve 63. As illustrated, guard electrode 66 has an extending flange 67 formed at the lower end thereof which is adapted to contact and seat against flange 64 of the insulator sleeve. In similar fashion a Teflon insulator sleeve 69 having an extending flange 70 formed at the lower end thereof surrounds guard electrode 66 with flange 70 engaging flange 67 of the guard electrode.

A measuring unit mounting block 72 of stainless steel is provided having a cylindrical upper portion 74 adapted to seat within opening 28 in the housing, and having a hollow cylindrical opening 75 formed therethrough adapted to receive insulator sleeve 69. As shown, flange 70 of the insulator sleeve engages the bottom end of mounting block 72.

An outer electrode 76, also preferably formed of stainless steel tubing, is provided generally surrounding the center electrode with its upper end firmly but removably engaging the lower end of mounting block 72. An outer cup 77 of suitable material such as glass is provided surrounding the entire measuring unit to confine oil samples to be tested therein. Electrode 76 has openings 78 formed therein to permit ingress and egress of fluid. Alternatively the lower end of electrode 76 could be closed so that the electrode wou'd resemble a cup, and openings could be provided in the side walls of the electrode to permit the ingress and egress of oil to be tested.

In the embodiment illustrated, center electrode 60 is significantly longer than the other electrodes and extends generally into the center of chamber 36 of the housing. Furthermore, guard electrode 66 extends above the ends of the insulator sleeves and is also exposed within chamber 36. This structure enables electrical contact to be made with triaxial connector 18. Since outer electrode 76 firmly engages conductive mounting block 72 and block 72 engages contact 54, electrical contact is provided between electrode 76 and contact 54.

Still referring to FIG. 4, triaxial connector 18 is particularly illustrated comprising an elongate center contact 85 including a hollow tubular portion 86, extending into the housing, and an enlarged solid tip 87 extending from the outer end thereof. Both portions of the center conductor are formed of conductive material, such as stainless steel. The end of conductor 85 that is confined within the housing is secured to a flexible contact clip 88 which is adapted to snap into conductive engagement with the end of center electrode 60. A Teflon insulator sleeve 91 is provided, surrounding center conductor 85. One end of sleeve 91 abuts an insulator washer 92 that is adapted to seat against tip 87.

A guard contact sleeve 94 is provided surrounding sleeve 91. One end of sleeve 94 abuts a contact washer 96 of stainless steel, adapted to seat against washer 92. In similar fashion, a Teflon insulator sleeve 102 is provided having one end that abuts an insulator washer 104. Sleeve 102 surrounds sleeve 94 with washer 104 contacting washer 96.

Triaxial plug mounting block 112, formed of stainless steel, is provided having a generally cylindrical outer surface 113 and a cylindrical opening 115 formed therethrough. As shown, the outer surface of the mounting block engages the periphery of opening 24 in the housing, as well as contact 54, and the inner opening 115 of the mounting block receives and supports insulator sleeve 102.

A T-connector 118 is provided within chamber 36 of the housing. As shown, one end of T-connector 118 surrounds the upper end of the gaurd electrode and the T extension of connector 118 surrounds a stainless steel guard contact 119. Guard contact 119 firmly engages guard contact sleeve 94 whereby suitable electrical contact is completed between the guard electrode and the guard contact of the triaxial connector. Contact 119 is separated from mounting block 112 by an insulator washer 121. Since mounting block 112 engages contact 54, suitable electrical contact is provided between the outer electrode and the outer guard contact of the triaxial connector.

The components of the cell are assembled by first assemblying the electrodes and insulators of the measuring unit and then placing the measuring unit into the housing. The measuring unit mounting block is locked in place in the housing by means of two set screws, not illustrated, extending through suitable openings in the housing. The T connector is then placed over the measuring unit guard electrode. Next, the triaxial connector components are assembled and the triaxial connector is inserted into the housing with the contact clip of the center contact clipped onto the measuring unit center electrode. The triaxial contact mounting block is then firmly locked into place by means of two set screws, again not illustrated, extending through suitable openings in the housing. The cover is then placed on the housing with one end thereof engaging the slot in the housing and the other end thereof being secured by screws 40. Removable plug 44 is then snapped into the thermometer hole.

The assembled cell is adapted for use with a flexible, extensible triaxial cable having a plug adapted to mate with triaxial connector 18. This enables the cell electrodes to be energized from a remotely located measuring circuit and display meter so that the cell can be utilized at various locations for measuring the power factor of oil samples, such as samples of elevated temperature. Such elevated temperature samples might be encountered in electrical equipment such as power transformers that are in operation. A suitable measuring circuit and display meter arrangement are described in copending application, Serial No. 251429, filed by Mahesh K. Sambhu.

The cell described herein is particularly advantageous when used for measuring oil power factor since the inner shield of the triaxial cable and the guard electrode of the cell cooperate to minimize electrical interference from surrounding electrical equipment. Furthermore the cell structure is particularly useful in measuring oil samples of elevated temperature since the temperature of the samples can be measured by insertion of a thermometer into the hollow portion of the center electrode. Finally, the cell structure described hereinbefore is particularly advantageous in that it is susceptible of assembly and disassembly. This greatly facilitites the maintenance and cleaning of the cell.

What is claimed is:

1. A test cell comprising a housing including a main body and a cover removably secured thereto defining a hollow central chamber, said housing having at least two openings formed therein, a measuring unit secured within one of the openings of said housing including a tubular center electrode, a tubular guard electrode and a tubular outer electrode concentrically secured together, interspersed with insulating sleeves, a triaxial connector mounted within the other opening in said housing including a center contact adapted to conductively engage said center electrode, a guard contact adapted to conductively engage a contact member secured to said guard electrode, and an outer contact adapted to conductively engage a contact member connected to said outer electrode.

2. The cell described in claim 1 wherein said cover is formed with an opening therein generally aligned with the center conductor of the measuring unit and a plug removably engaged in said opening.

3. The cell of claim 1 wherein said contacts and said electrodes are fabricated of stainless steel tubing and said insulators are formed of Teflon.

4. The test cell of claim 1 wherein said measuring unit is surrounded by a glass cup having openings formed in the sides thereof.

* * * * *